United States Patent Office 3,198,248
Patented Aug. 3, 1965

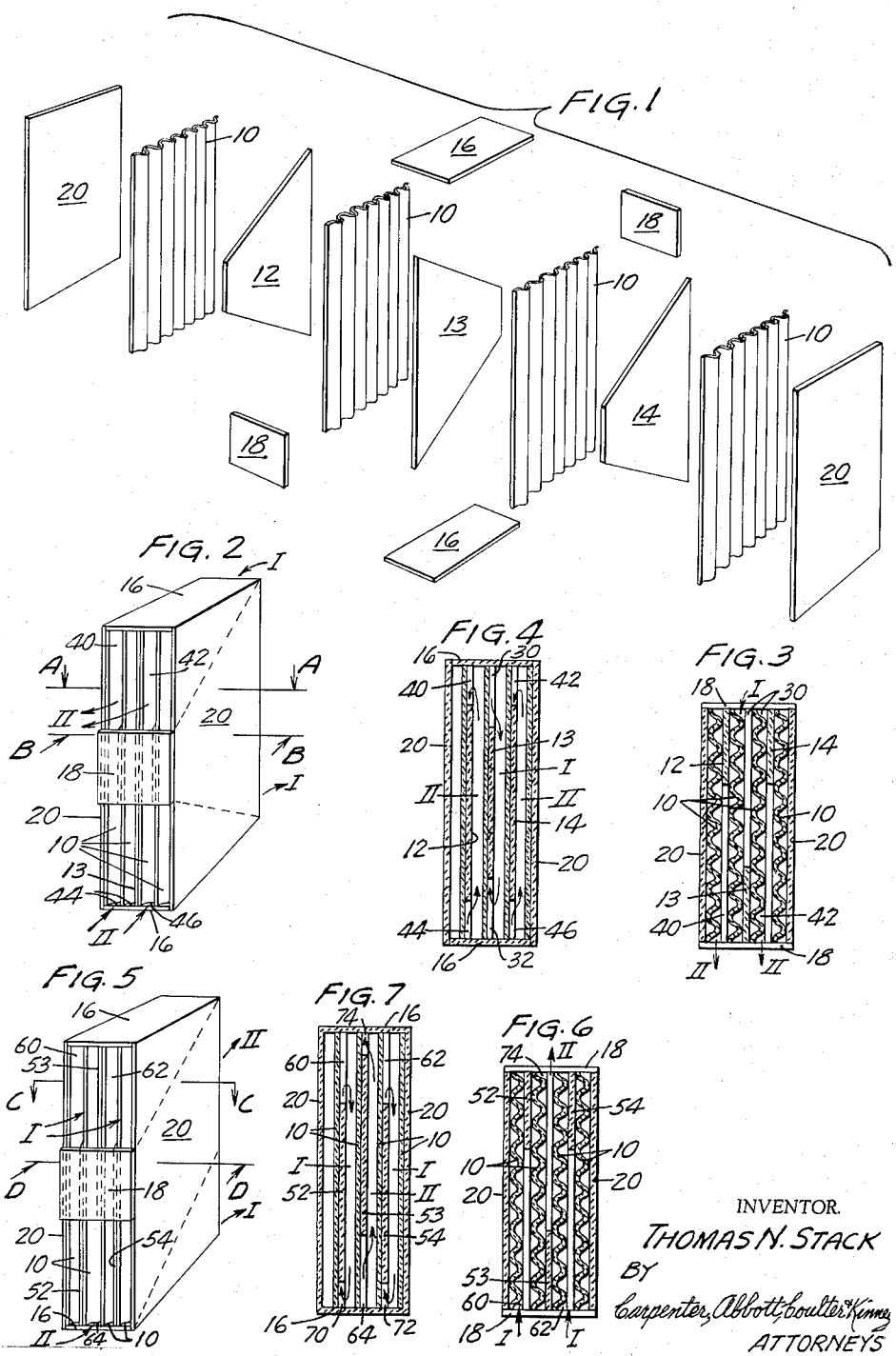

3,198,248
CORRUGATED HEAT TRANSFER EXCHANGERS
Thomas Noel Stack, St. Paul, Minn., assignor to Minnesota Mining and Manufacturing Company, St. Paul, Minn., a corporation of Delaware
Filed Apr. 10, 1963, Ser. No. 271,929
2 Claims. (Cl. 165—166)

This invention relates to fluid handling apparatus and particularly to refractory heat exchangers.

In carrying out continuous exothermic reactions occurring at elevated temperatures it is generally required that at least a portion of the heat of the effluent products of reaction materials be recovered by preheating entering materials (frequently gases at elevated temperatures) therewith. For such purposes a heat exchanger which is resistant to high temperatures, to the reactants and to the reaction products is useful.

While some metals are of value as materials of construction for heat exchangers to be used at high temperatures, the properties desired are generally speaking best provided by ceramics. These, however, are not only difficult to fabricate to provide intricate shapes such as are used in conventional heat exchanger designs, but such designs result in very massive and heavy articles which are likely to be fragile. For example, pebble bed recuperative type heat exchangers have been used, in which ceramics pieces of various shapes have been used to store heat. Such devices are, however, generally best suited to large, permanent installations.

For portable devices, particularly for mobile use, lighter, more compact units are desired, particularly heat exchangers in which counter-current flow is utilized, so as to enable the use of casing shapes and manifolding which are difficult to achieve or even practically infeasible with simple cross-flow heat-exchange units. Preferably such heat exchangers should possess the corrosion-resistant advantages of ceramics at elevated temperatures and still possess high heat-exchanging capacity in small space.

It is an object of this invention to provide fluid handling apparatus in which heat exchange is effected efficiently. It is another object of this invention to provide counter-current flow heat exchangers utilizing refractory ceramic units as flow directors having increased heat transfer surfaces. A further object of this invention is to provide compact heat exchangers in which access of gases in different directions by manifolding means is controllable with insignificant bypassing.

Other objects of the invention will become evident hereinafter.

In accordance with these and other objects of the invention it has been found that a refractory ceramic counter-current flow heat exchanger having exceptional heat exchanging capacity in small volume is provided by assembling corrugated and flat sheets of thin ceramic material of particular geometrical outlines sequentially. In the assembly alternate sheets are rectangular and longitudinally corrugated or grooved and between them are trapeziform flat sheets which successively are in mirror image relationship.

As used herein the terms "trapezium" and "trapeziform" are employed in reference to quadrilateral figures having two sides parallel in which no angles are 90°, i.e. the angles are oblique. These terms are here used as generic to the terms "trapezoid" and "trapezoidal," respectively, which here refer to quadrilateral figures having only two sides parallel and oblique angles and to "rhomboid" and "rhomboidal," respectively, which refer to parallelograms (i.e. quadrilateral figures having opposite sides parallel) in which the angles are oblique. For the purposes of this invention "rhombus" and "rhombic" in their common meaning are considered the equivalents of "rhomboid" and "rhomboidal," respectively.

In order to more fully and clearly explain the invention, drawings are provided wherein:

FIGURE 1 shows an exploded view in perspective of a counter-current flow heat-exchanger of the invention having trapezoidal flat manifolding plates.

FIGURE 2 shows a perspective view of the assembled counter-current flow heat-exchanger of FIGURE 1.

FIGURE 3 is a cross-sectional view of the assembled counter-current flow heat-exchanger of FIGURE 2 along line A—A.

FIGURE 4 is a cross-sectional view of the assembled counter-current flow heat-exchanger of FIGURE 2 along line B—B.

FIGURE 5 shows a perspective view of an assembled counter-current flow heat-exchanger of the invention having rhomboidal flat manifolding plates.

FIGURE 6 is a cross-sectional view of the heat-exchanger of FIGURE 5 along line C—C.

FIGURE 7 is a cross-sectional view of the heat-exchanger of FIGURE 5 along line D—D.

Referring again to the drawings, in FIGURE 1 it will be seen that a counter-current flow heat-exchanger of the invention comprises alternating grooved or regularly undulate, substantially identically rectangular, heat-exchanging panels, sometimes hereinafter termed corrugated sheets, wall members or sheets, here shown having longitudinal corrugations, and flat, or planar, trapeziform substantially identical spacer members, sometimes hereinafter called flat sheets or manifolding sheets 12, 13, and 14 which here are isosceles trapezoidal in shape, that is the non-parallel sides or inclined edges are of equal length. It will be seen that the spacer members are substantially coextensive over a portion of their width with panels 10 and substantially coterminous at acute-angled corners with corners thereof. It will further be seen that the successive manifolding sheets are in inverse or mirror image relationship, that is, 13 is the mirror image of both 12 and 14. The heat-exchanger further comprises end plates 16 spanning the respective undulate ends of panels 10 and bonded thereto and to the acute-angled corners of spacer members 12, 13, 14. In these heat-exchangers it is preferred to employ ceramics of the same composition for all the pieces and to cement them together with the same composition so that a homogeneous structure is obtained. The front and back facing sheets 18 and the surfacing sheets 20 are not essential to the construction of a heat-exchanger of the invention but are desirable so that the heat-exchanger can be fitted more conveniently into an apparatus such as an automobile exhaust afterburner.

In FIGURES 2, 3 and 4 it will be seen that the parts shown in FIGURE 1 and bearing the same reference numbers are joined together. In FIGURES 2 and 5, the projected outline of the nearest spaced member is shown on the surfacing sheet 20 by broken lines. In FIGURES 2 to 7, the parts are cemented together so that the structures are both integral and homogeneous. However, the parts are shown as distinct so that the construction will be more readily understood. Hidden lines are not shown in the cross-sectional views.

It will be seen in FIGURE 2 that the long edge of the spacer member 13 is visible both above and below the front facing plate and the inclined edges of the spacer members 12 and 14 which slope upward and downward toward the rear corners of the heat-exchanger and are included between panels 10, are not seen. In FIGURE 4 the rearward narrow hidden converging inclined edges of spacer member 13 manifold the rearwardly opening passages 30 and 32; the rearwardly diverging inclined edges of spacer members 12 and 14 are visible. The passageways 40, 42, 44 and 46 open forwardly as shown in FIGURE 2. The passageways are evident in FIGURE 3. Passageways 40 and 44, 42 and 46 and 30 and 32, respectively, mutually communicate. They may be considered as openings into undulate chambers defined by the corrugated sheets and the end plates in which the manifolding sheets are located. The grooved sheets are illustrated as undulate in simple wave form, but it will be recognized that the wave form may be square or trapezoidal (as herein used) in cross-section. It is critical to obtain undulate chambers which do not constrict fluid or gas flow. When using sheets of the simple wave form here shown, all corrugated sheets must have substantially the same frequency and be mutually substantially in phase as shown in the drawings and is particularly clear from FIGURE 3. In all arrangements like portions of consecutive panels are substantially equidistant at opposing points. The arrangements necessary with other waveforms will be apparent to those skilled in the art from the general disclosure herein made.

The counter-flow heat-exchanger shown in FIGURES 5, 6 and 7 also includes end plates 16, front and rear facing plates 18 and surfacing sheets 20. It will be seen that the panels 10 are arranged and in phase as in the heat-exchanger of FIGURES 1 to 4 above. In the heat-exchanger of FIGURES 5, 6 and 7, the spacer members 52, 53 and 54 are rhomboidal in shape and portions of each are visible in FIGURES 5, 6 and 7. The invisible inclined edges of each slope upwardly for spacer members 52 and 54 and downwardly for sheet 53. The hidden rearward corners of each sheet are not shown. FIGURE 6 will be seen to be indistinguishable from FIGURE 3 because it shows a cross-section through only one end of the manifolding sheets and in this view no effects of the different shapes of the manifolding sheets are visible. This illustrates the generic character of the apparatus for and the process of fluid handling of the invention as well as the specific embodiments. In FIGURES 5, 6 and 7 rearward passages 70, 72 and 74 communicate respectively to passageways 60, 62 and 64.

It will be seen that in these drawings very simple embodiments having only four grooved sheets and three manifolding sheets are shown so that there will be no confusion as to the structure of the heat-exchangers of the invention. Many more corrugated sheets and manifolding sheets are assembled repeating the sequence shown to give a heat-exchanger of larger capacity. There will always be numerically one more grooved sheet than the number of manifolding sheets.

The flow of gases, designated I and II, is shown graphically by means of arrows indicating direction of flow in FIGURES 2, 3 and 4 for the embodiment in which trapezoidal manifolding sheets are used in the construction and in FIGURES 5, 6 and 7 for the embodiment in which rhomboidal manifolding sheets are employed. It will be seen that in FIGURE 2 each gas enters and leaves from the same side of the heat-exchanger whereas in FIGURE 5 both gases in effect pass through diagonally and leave from the opposite side.

Materials from which these corrugated and flat refractory sheets are formed in the green state may be described as shape-retentive, flexible green ceramic sheets. These may be either of two types: those prepared from ceramic powders with added organic binder and those prepared from ceramic powders without organic binder. Compositions of the former type contain approximately 5 percent of a temporary organic binder such as a thermoplastic polymer to fill the voids in the ceramic powder and hold it together. The thermoplastic binder is preferably one which decomposes on heating without charring. Synthetic polymers such as acrylates, methacrylates and polystyrene and substances such as methyl cellulose are illustrative of useful thermoplastic binders.

Where the ridges of corrugations on one side of a corrugated film are to be welded to a sinterable flat sheet member or panel, the basic raw material mix from which the sinterable film or sheet material was formed is diluted with organic solvents or fluids to adjust viscosity, and then painted over the ridges of the corrugations as a glue medium for affixing a sinterable sheet member thereto. The solvent of the applied glue medium between the ridges of corrugations and the sheet member may tend to solvate a portion of the adjacent film and sheet member before volatilizing into the air. In any event, once the structure is dried, a temporary bond between the ridges and the sheet member is formed, which, after the structure is fired to sintering temperatures, turns into a strong and rigid weld.

The corrugated sheets form walls of the undulate chambers and are desirably relatively non-porous, however, for most purposes it is necessary that they be impervious to gases but they should be sealed to the end plates and to the facing plates and manifolding sheets to avoid by-passing of gases.

A suitable green ceramic sheet for constructing heat-exchangers of the invention is made from 68.4 parts of alumina, 3.6 parts of tetrapolymer (an organic binder composed of about 30% by weight of octadecyl acrylate, 30% by weight of acrylonitrile, 35% by weight of cyclohexyl acrylate and 5% of acrylic acid copolymerized in ethyl acetate) and 28 parts of solvent (composed of about 20% ethyl acetate, about 40% Cellosolve acetate and about 40% nitroethane by volume) and if formed into sheets about 24″ wide and .015″ thick by knife coating. A portion of the mixture is retained for use described below. The resultant sheets are leathery and flexible and when dry and at room temperatures are not adherent to one another since the organic binder only becomes fluid at elevated temperatures. A portion of the sheets is corrugated by passage between hot (300° F.) corrugating rollers which impress thereon a corrugated pattern of parallel grooves and ridges of 5 corrugations per inch, about 0.110″ high. The pattern is retained on cooling and the corrugated sheet is also flexible.

The trapeziform pieces to be used in the assembly operation are cut to fit within a rectangle about 6 inches long and 1.4 inches wide from the flat sheet material. The acute angles of these pieces are about 45° at each end and produce rhomboidal or trapezoidal manifolding sheets, respectively, when the one side is about 4.6 inches or 6 inches long. The corrugated sheets are cut to rectangles 6 inches along parallel ridges by 1.4 inches wide (7 complete corrugations, i.e. 7 grooves and 7 ridges). Flat surfacing sheets of the same dimensions are also cut. The end plates and facing plates are cut subsequently to fit the dimensions needed.

Assembly of the body of the heat exchangers unit then proceeds by stacking appropriate pieces in proper order adhering the ridges of the corrugates to the flat pieces using as cement the retained portion of the original mix diluted to a thin creamy consistency with a mixture of equal volumes of Cellosolve acetate and nitroethane. A flat surfacing sheet is laid down, painted with the cement and a rectangular corrugated sheet positioned thereon. A trapeziform piece is then cemented to the ridges of the underlying corrugated sheet and to a further corrugated sheet on top of it. These consecutive corrugated sheets must be in phase, that is with ridges in one facing a groove in the next as shown in the drawing. The outer edges parallel to the axes of corrugation, i.e. the opposing straight edges of the wall members, thus are in phase and are along a line of maximum amplitude of corrugations. It is essential that the joints between trapeziform and corrugated sheets (at least at the outer edges) be tight because the joints at these points are sealing means between opposing straight edges of adjacent wall members serving to confine gas flow to the desired undulate chambers.

The ridges of the second corrugated sheet are coated with the cement and another trapeziform manifolding sheet is positioned therein reversing the positions of the acute angles so that it is in mirror image relation to the first positioned trapeziform manifolding sheet. This sequence is repeated until a green shape of the desired size is formed finishing off with a corrugated sheet and a rectangular surfacing sheet.

The ends are trued because it is not usually possible to assemble all the pieces in exact alinement, and flat sheets cemented thereto to form the ends of the undulate chambers. Pieces of flat sheet are cemented to the sides between the openings using sufficient cement to fill the half-corrugations at that point.

If desired a locating sheet or key piece may be cemented to the surface of the heat-exchanger at a point selected for the particular equipment in which the heat-exchanger is to be used. It will be realized that the structure of key pieces is largely a matter of convenience since the purpose is primarily for positioning the heat exchanger unit and any obvious or convenient construction may be employed. A hollow structure is desirable to increase thermal shock resistance and decrease weight.

The assembled units, as shown in FIGURES 2 and 5, are dried to 140° C. over a a 36 hour cycle to remove residual solvent and fired for 1 hour at 1450° C. The homogeneous and integral assembly shrinks about 10% on firing. The heat-exchangers of the invention may be incorporated in automobile exhaust afterburners to heat exhaust gases for completion of combustion by means of the fully burned gases.

It will be apparent that numerous variations in the heat-exchangers of the invention are possible without departing from the scope or spirit of the invention. The dimensions of heat exchanger units can be varied to give more or less back pressure.

Basically the invention concerns the manifolding of gases using bias-cut flat sheets in combination with corrugated sheets in the plurality of undulate chambers. The walls at the ends of the chambers not occupied by the flat sheets will be seen to effectively define plenums or manifolds to the fluid conducting passageways while serving as portions of the heat transfer surfaces of the heat exchangers of the invention.

Counter-current gas-flow is obtained in successive chambers by alternation of the direction of bias-cuts in successive chambers and feeding and removing gases at proper ports or openings. Heat-transfer is through the undulate walls between chambers. It will be apparent that the greater surfaces thus provided give enhanced opportunity for heat transfer in small volumes and that homogeneous refractory materials permit operation at elevated temperatures almost up to the melting point of the material employed.

What is claimed is:
1. A fluid handling apparatus having
(I) at least three regularly undulate, substantially identically rectangular, heat-exchanging panels, spaced apart with like portions thereof substantially equidistant at opposing points;
(II) at least two substantially identical, planar spacer members of trapezoidal shape, each member positioned between and spacing apart a pair of said undulate panels and joined thereto along all lines of contact; said spacer members being substantially coextensive over a portion of their width with said panels and substantially coterminous at acute-angled corners with corners of said panels; and consecutive spacer members being inversely positioned; and
(III) end plates on two side of the joined panels and members, said plates spanning the respective undulate ends of said panels and each of said plates being bonded to said ends and to only one acute-angled corner of each of said planar spacer members, and means directing the flow of fluid toward and from the edges of the joined panels and members not spanned by said plates.
2. A fluid handling apparatus having
(I) at least three regularly undulate, substantially identically rectangular, heat-exchanging panels, spaced apart with like portions thereof substantially equidistant at opposing points;
(II) at least two substantially identical, planar spacer members of rhomboidal shape, each member positioned between and spacing apart a pair of said undulate panels and joined thereto along all lines of contact; said spacer members being substantially coextensive over a portion of their width with said panels and substantially coterminous at acute-angled corners with corners of said panels; and consecutive spacer members being inversely positioned; and
(III) end plates on two sides of the joined panels and members, said plates spanning the respective undulate ends of said panels and each of said plates being bonded to said ends and to only one acute-angled corner of each of said planar spacer members and means directing the flow of fluid toward and from the edges of the joined panels and members not spanned by said plates.

References Cited by the Examiner

UNITED STATES PATENTS 2,995,344  8/61  Hryniszak _____ 165—166

FOREIGN PATENTS 743,201  2/54  Great Britain.
134,679  2/52  Sweden.

CHARLES SUKALO, *Primary Examiner.*